– – –

United States Patent [19]

Barney et al.

[11] 3,932,355

[45] Jan. 13, 1976

[54] PREPARATION OF SOL CHLOROPRENE POLYMERS

[75] Inventors: Arthur Livingston Barney, Wilmington; Ausat Ali Khan, Newark, both of Del.

[73] Assignee: E. I. Du Pont de Nemours and Company, Wilmington, Del.

[22] Filed: Dec. 5, 1974

[21] Appl. No.: 530,035

Related U.S. Application Data

[63] Continuation-in-part of Ser. No. 481,375, June 19, 1974, abandoned.

[52] U.S. Cl. ...... 260/63 HA; 260/82.1; 260/85.5 R; 260/85.5 XA; 260/86.3; 260/87.5; 260/92.3
[51] Int. Cl.² .............. C08G 2/00; C08F 214/00; C08F 136/16; C08F 220/42
[58] Field of Search ............ 260/92.3, 63 HA, 82.1, 260/85.3 R, 85.5 XA, 86.3, 87.5

[56] References Cited
UNITED STATES PATENTS

| | | | |
|---|---|---|---|
| 2,674,619 | 4/1954 | Lundsted | 260/485 G |
| 3,226,375 | 12/1965 | Greth et al. | 260/82.1 |
| 3,838,141 | 9/1974 | Turner | 260/92.3 |

*Primary Examiner*—Joseph L. Schofer
*Assistant Examiner*—Herbert J. Lilling

[57] ABSTRACT

Addition of a polyether in which one radical is a 2-hydroxyethyl- or 2-hydroxypropyl-terminated chain of two or more oxyethylene or 2-oxypropylene units and the other radical is either a defined hydrocarbon group or the 2-hydroxyethyl group to an aqueous alkaline emulsion in which chloroprene or a mixture of chloroprene with another monomer is undergoing polymerization in the presence of an alkyl mercaptan makes it possible to carry out the polymerization to a high degree of conversion, while at the same time avoiding excessive gel formation. This invention makes possible a significant increase in polymer yield without sacrifice of polymer quality or performance.

10 Claims, No Drawings

PREPARATION OF SOL CHLOROPRENE POLYMERS

CROSS-REFERENCE TO RELATED APPLICATION

This is a continuation-in-part of our copending application Ser. No. 481,375, filed June 19, 1974, and now abandoned.

BACKGROUND OF THE INVENTION

This invention relates to an improvement in the process for the polymerization of chloroprene to mercaptanmodified polymers.

Polymerization of chloroprene in an alkaline aqueous emulsion in the presence of alkyl mercaptans as chain transfer agents is well known. It has been customary in prior practice to stop chloroprene polymerization at a point at which no significant amount of gel was formed because a significant amount of such gel is a chloroprene polymer adversely affects such processing characteristics as polymer smoothness, die definition, and surface appearance of extruded objects. Furthermore, in the preparation of solvent based adhesives, such as rubber cements, it is undesirable to have present an excessive amount of solvent-insoluble material.

The point at which gel formation becomes apparent in a chloroprene polymerization varies with the temperature of polymerization. For example, at 40°C. in a normal emulsion system, the maximum monomer conversion possible has been in the neighborhood of 65 to 70%. While gel formation can be delayed by lowering the temperature of polymerization, changes in the crystalline nature of the resulting polymer make the polymer less suitable for certain low temperature applications of the final vulcanizate. At 0° to 10°C., polymerization can be carried to a conversion as high as about 90%. These polymers crystallize rapidly and are, therefore, well suited for use in adhesives. Even in these high-conversion polymerizations, it is economically desirable to increase the monomer conversion without producing substantial amounts of polymer insoluble in usual solvents.

There is, therefore, a great need for an economically attractive process for polymerizing chloroprene monomer to a high degree of conversion without sacrificing the desirable properties of the resulting polymer.

SUMMARY OF THE INVENTION

The improvement of the present invention provides for polymerization of chloroprene in an alkaline aqueous emulsion in the presence of a $C_8$-$C_{20}$ alkyl mercaptan and of about 0.05–1 part by weight, per 100 parts of the starting monomer of a polyether represented by the following formula:

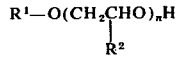

wherein $R^1$ is (a) a $C_{10}$-$C_{30}$ alkyl, aralkyl, alkenyl in which the double bond is separated from the oxygen atom by at least one saturated carbon atom; a $C_6$-$C_{30}$ aryl or alkaryl; dihydroabietyl, or tetrahydroabietyl; or (b) 2-hydroxethyl; and $R^2$ in each parenthetical unit is, independently of any other such unit, either hydrogen or methyl; with the proviso that when $R^1$ is (a), $n$ is a number having an average value of from 2 to about 50; and when $R^1$ is (b), $n$ is a number such that the molecular weight of the compound is from about 1000 to about 6000, the units in which $R^2$ is hydrogen constituting 10 to 80% by weight of the polyether and being present as the two terminal blocks, the central block of the polyether being constituted of units in which $R^2$ is methyl, this central block having a molecular weight from about 900 to about 4000.

Definition: For the purpose of the present disclosure, the terms "polymerization of chloroprene" and "chloroprene polymer" include copolymerization of chloroprene with up to equal weight of a copolymerizable monomer and a copolymer of chloroprene with a copolymerizable monomer, respectively. The term "monomer" means chloroprene or a mixture of chloroprene with a copolymerizable monomer.

DETAILED DESCRIPTION OF THE INVENTION

The presence of a polyether represented by the above formula is critical to the success of the invention. In its presence, the polymerization can be allowed to proceed to a high monomer conversion and still produce a polychloroprene product substantially free of gel polymer.

An essential feature of the polyethers suitable in the process of the instant invention is that they contain at least one terminal 2-hydroxyethyl or 2-hydroxypropyl group. These ethers are conveniently prepared by reaction of ethylene oxide and/or propylene oxide with an appropriate hydroxylterminated compound. When $R^1$ is other than 2-hydroxyethyl, the ether is prepared by reaction of ethylene oxide or propylene oxide with the corresponding compound $R^1$-OH. When $R^1$ is bonded to the oxygen atom through an aliphatic carbon atom, $R^1$ should contain at least ten carbon atoms to impart to the compound the proper balance between hydrophilic and lipophilic properties. When $R^1$ is bonded to the oxygen atom through an aromatic carbon atom, the lower limit of the range is lowered to six carbon atoms. The upper limit is not critical. There is no advantage in exceeding thirty carbon atoms.

The reaction of alcohols, phenols, naphthols, etc. with ethylene and propylene oxide is well known in the art. This condensation may be carried out in the presence of water or an alcohol and is catalyzed by alkalies such as sodium hydroxide, potassium hydroxide, or potassium methoxide. The amount of the catalyst is about 0.005 to 0.05 mole per mole of the starting alcohol or phenol. The reaction temperature is about 100°–200°C.

When $R^1$ is an alkyl or alkenyl radical, the starting alcohol can contain a branched or linear chain. The alcohols may be derived, for example, from fats and oils such as coconut oil and tallow. A frequently occurring radical is derived from oleic acid. The alcohol may also be obtained by the OXO process or derived from a low molecular weight polypropylene or polyisobutylene. The preferred alkyl or alkenyl groups contain 12 to 18 carbon atoms because these provide the best hydrophilic-lipophilic balance.

When $R^1$ is alkaryl or aralkyl, the hydroxy compound used for reaction with the epoxide is usually an alkylphenol or phenyl-substituted alcohol in which the alkyl portion contains at least 4 carbon atoms. Frequently, the alkyl radical is branched octyl or nonyl, derived from isobutylene or propylene by dimerization or trimerization, respectively. In the commercially available alkylated phenols, both ortho- and para-alkylated materials can be present as well as some dialkylated phenols. Recently linear alkylphenols have become important because of their improved biodegradability. These are prepared by alkylating phenol with a linear 1-alkene or by other well-known methods.

Unsubstituted aryl groups include, for example, phenyl, naphthyl, anthryl, and phenanthryl. They are derived from the corresponding hydroxyaryl compounds, such as phenol, naphthol, anthranol, and phenanthrol. Tetrahydro- and dihydroabietyl groups can be introduced by epoxidation of a commercial mixture containing tetrahydro-, dihydro-, and dehydroabietyl alcohols, sold under the name Abitol (Hercules Co.).

When $R^1$ is a hydrocarbon radical best results are obtained when n has a value of from 3 to 20. No more than 50 moles of the epoxide should be allowed to react with the alcohol or phenol because more than this amount would change the hydrophilic nature of the compound.

Representative starting alcohols and phenols for reaction with ethylene oxide and/or propylene oxide include:

Alcohols

1-Decanol
1-Dodecanol
1-Tetradecanol
1-Hexadecanol
1-Eicosanol
9-Octadecen-1-ol
Tridecanol (various isomeric forms, obtained by the OXO process from tetrapropylene)
7-Dodecen-1-ol
2,6,8-Trimethyl-4-nonanol Phenyl-Substituted Alcohols 4-Phenyl-1-butanol
6-Phenyl-2-octanol
1-Phenyl-2-tridecanol
4-Phenyl-3-hexanol
6-Phenyl-1-hexanol Hydroxyaryl and Hydroxyalkaryl Compounds Phenol
α-Naphthol
β-Naphthol
Anthranol
4-Methylphenol
2,4-Dimethylphenol
2-Phenylphenol
4-n-Butylphenol
4-tert-Butylphenol
4-(1,1,3,3-tetramethylbutyl)phenol
4-Nonylphenol
4-Dodecylphenol
4-(2-Methylheptyl)phenol
4-(Trimethylnonyl)phenol as well as the corresponding 2-alkylphenols and mixtures containing the dialkylated phenols.

When $R^1$ is 2-hydroxyethyl, in order to have the proper hydrophilic-lipophilic balance, the polyether must contain a central block of hydrophobic poly(oxypropylene) units having a molecular weight of at least 900 and terminal hydrophilic poly(oxyethylene) units. These compounds are available from BASF Wyandotte Corp. under the trademark "Pluronic" and can be made according to the teachings of U.S. Pat. No. 2,674,619 to Lester G. Lundsted. The molecular weight of the central polyoxypropylene block can be readily determined during the synthesis by the well-known technique of hydroxyl number determination. When a commercial product is used, manufacturers' specifications normally would be followed. In any event, the structure of the polyether can be ascertained by a combination of well-known techniques such as:

1. Molecular weight determination, e.g., by osmometry;
2. Nuclear magnetic resonance and/or infrared spectroscopy;
3. Elemental analysis (propylene oxide contains 27.6% oxygen, ethylene oxide 36.3%); and
4. Comparison of surfactant properties with those of commercial or synthetic products of known structure.

The upper limit of the concentration range of the polyether additive in the polymerization medium is not critical, except that the desired effect is achieved at a concentration of up to about 1 part per 100 parts of monomer, and further increase of concentration is merely wasteful. However, below the lower limit of the concentration range, the effect of the ether may not be significant enough to be of practical interest.

Representative comonomers that can be copolymerized with chloroprene in the process of the present invention include vinyl aromatic compounds, such as styrene, the vinyltoluenes, and vinylnaphthalenes; aliphatic conjugated diens such as 1,3-butadiene, isoprene, 2,3-dimethyl-1,3-butadiene, and 2,3-dichloro-1,3-butadiene; vinyl ethers, esters, and ketones, such as methyl vinyl ether, vinyl acetate, and methyl vinyl ketone; esters, amides, and nitriles of acrylic and methacrylic acids, such as ethyl acrylate, methyl methacrylate, methacrylamide, and acrylonitrile.

The polymerization process is carried out in a manner well known in the art. The monomer is emulsified using a conventional carboxylated emulsifying agent. These emulsifying agents include water-soluble soaps of monocarboxylic acids containing 10 to 20 carbon atoms per molecule, which may be saturated or unsaturated fatty acids or rosin acids such as wood rosin or tall oil rosin or hydrogenated, dehydrogenated, or disproportionated rosin acids. The cations may be sodium, potassium, ammonium, or substituted ammonium; typical substituents being lower alkyl and hydroxyalkyl, especially methyl, ethyl, 2-hydroxyethyl, and 2-hydroxypropyl. The preferred emulsifying agents are the sodium, potassium, or ammonium salts of wood rosin or disproportionated resin acids because of the desirable properties they impart to the resulting polymer, such as good tack and processability. About 1–4 parts by weight of emulsifying agent per 100 parts of monomer will normally be used, 3–4 parts being preferred.

An organic surfactant of the sulfate or sulfonate type may also be present in the polymerization system as additional emulsifying agent. Such surfactants are well known and include, among others, alkyl sulfonates, alkyl sulfates, sulfonated and sulfated ethers, sulfonated alkyl esters of long chain fatty acids, sulfonated glycol esters of long chain fatty acids, sulfonated n-alkylamides, alkylaryl sulfonates, and alkyl sulfosuccinates. A good discussion of sulfate and sulfonate surfactants suitable in the polymerization process according to the present invention can be found, for example, in U.S. Pat. No. 2,607,753, to James W. Adams, in column 4, lines 8–64. The preferred emulsifying agent of this type is the condensation product of formaldehyde and a naphthalenesulfonic acid in which the naphthalene nucleus can be substituted with one or more alkyl groups. The colloidal stability of the latex subsequent to the polymerization is increased in the presence of a sulfate or sulfonate type emulsifying agent. The same cations can be associated with sulfate and sulfonate type emulsifying agents as with carboxylic emulsifying agents. The concentration of any sulfate or sulfonate emulsifying agent, if present, is up to about one part by weight per 100 parts of monomer, 0.4–0.6 part being preferred.

The pH of the polymerizing emulsion is kept at about 10–13. The monomer concentration, while not critical, normally is about 40–60% of the total weight of the emulsion.

The alkyl mercaptans used as chain transfer agents can be branched or linear. Dodecyl mercaptan, which is frequently used, is a mixture of alkyl mercaptans derived from coconut oil and containing from ten to eighteen carbon atoms. Other useful mercaptans include octyl, tert-dodecyl, and tridecyl mercaptans. The proportion of the mercaptan will depend on the type of polymer desired. If a polymer of high Mooney viscosity (that is, relatively high molecular weight) is desired, only a small amount of chain-transfer agent is used. On the other hand, fluid polymers having Brookfield viscosities in the range of 1,000–1,000,000 centipoises at 25°C. can be prepared by using larger amounts of mercaptan. The useful range will be between 0.05 and 2 parts of mercaptan per 100 parts of monomer. While the viscosity of the polymer will largely depend on the amount of mercaptan present in the system, the viscosity of the polymer will vary somewhat from that obtained when the polyether additive is absent. The mechanism of this effect is not clearly understood. The exact amount of each agent to be used can be readily determined by one skilled in the art.

Polymerization is initiated and maintained by the addition of a free-radical polymerization catalyst, such as alkali metal or ammonium persulfates or organic peroxy compounds. The temperature of polymerization can vary within the range from the freezing point of the emulsion (about 0°C.) to about 52°C., preferably from 10° to 48°C. When the desired degree of polymerization is reached, polymerization is stopped by adding a short-stopping agent such as, for example, phenothiazine and 4-tert-butylpyrocatechol. Unchanged monomer can be steam-stripped, for example, as shown in U.S. Pat. No. 2,467,769. The chloroprene polymer can be used as a latex or can be isolated from the latex, for example, by the freeze roll technique such as that disclosed in U.S. Pat. No. 2,187,146 or by any other conventional method.

Other conditions being the same, the presence of the polyether of the above formula in the polymerization system makes it possible to obtain sol polymer substantially free of a gel component at a monomer conversion higher than was possible in prior art polymerization systems. In general, higher proportions of mercaptan and of the polyether are required at higher temperatures and for higher conversions. The required amounts of these ingredients can be readily determined by one skilled in the art. Monomer conversions of up to substantially 100% are obtainable in the instant process.

The invention now is illustrated by the following example of a representative embodiment thereof where all parts, proportions and percentages are by weight, unless indicated otherwise.

Example

An aqueous emulsion of chloroprene is prepared using the following recipe:

| | Parts |
|---|---|
| Chloroprene | 100 |
| Disproportionated rosin | 3 |
| Dodecyl mercaptan (DDM) (a) | as shown |
| Ether of Formula (1)(b) | 0.5 |
| Water | 91.5 |
| Sodium hydroxide | 0.55 |
| Sodium salt of a condensate of formaldehyde and naphthalenesolfonic acid (c) | 0.6 |
| Sodium sulfite | 0.3 | a. Technical dodecyl mercaptan, which is a mixture of mercaptans derived from coconut oil. A typical average composition by weight is:
3% 1-decanethiol; 61% 1-dodecanethiol;
23% tetradecanethiol; 11% 1-hexadecanethiol; and 2% octadecanethiol.

b. The following polyethers are used in Experiments A-F:
A. Tridecanol, adduct with 10 moles of propylene oxide
B. Nonylphenol, adduct with 3 moles of propylene oxide
C. Nonylphenol, adduct with 15 moles of propylene oxide
D. Octylphenol, adduct with 9–10 moles of ethylene oxide ("Triton" X-100, Rohm & Haas)
E. Octylphenol, adduct with 3 moles of ethylene oxide ("Triton" X-35, Rohm & Haas)
F. Composition of the structure

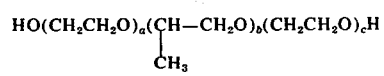

which is a liquid having an average molecular weight of about 5000, a specific gravity of 1.01 and consisting of about 80% of poly(oxypropylene) units and about 20% of poly(oxyethylene) units ("Pluronic" L122, BASF Wyandotte Corp.)
G. 2-Naphthol, adduct with 8.5 moles of ethylene oxide
H. o-Phenylphenol, adduct with 9.2 moles of ethylene oxide
I. o- and p-Phenylphenol (82% p-Phenylphenol) adduct with 9.2 moles of ethylene oxide.

c. Commercially available as "Lomar" PW, Nopco Chemical Division, Diamond Shamrock Chemical Co.

Polymerization is carried out at 40°C. to a monomer conversion as shown in the Table, below. The catalyst is an aqueous solution of potassium persulfate. Polymerization is stopped by adding an emulsion containing equal parts of phenothiazine and 4-tert-butylpyrocatechol (0.01 to 0.02 part per 100 parts of chloroprene). Unchanged monomer is removed by turbannular steam stripping, substantially as described in U.S. Pat. No. 2,467,769. The emulsion is acidified to a pH of about 5.6 with dilute acetic acid, and the polymer is isolated by freeze rolling as described in U.S. Pat. No. 2,187,146. Solubility of the polymeric product is determined by adding a 1–5 gram sample of polymer to 100 ml. of benzene in a bottle which is stoppered and shaken 4–8 hours at room temperature. The specimen is examined visually for an insoluble portion. The Mooney viscosity of the isolated polymer (ML 1+2.5/100°C.) is determined according to ASTM D 1646-67. The results are summarized in the Table, below:

TABLE

| Polyether Additive | A | B | C | D | E | F | G | H | I |
|---|---|---|---|---|---|---|---|---|---|
| DDM parts | 0.28 | 0.28 | 0.28 | 0.28 | 0.28 | 0.28 | 0.255 | 0.255 | 0.255 |
| Conversion, % | 87.1 | 85.6 | 85.3 | 86.8 | 83.4 | 82.5 | 85.6 | 83 | 84.3 |
| Mooney Viscosity | 50 | 52.5 | 60 | 41 | 44.5 | 49 | 56 | 48 | 52 |
| Solubility in Benzene, % | 100 | 100 | 100 | 90–95 | 100 | 100 | 100 | 100 | 100 |

The processability (extrusion rate and appearance of milled samples) and the physical properties, such as modulus, tensile strength, elongation and compression set, of vulcanizates are found to be substantially equivalent to those of a chloroprene polymer made by a similar recipe, but in the absence of the polyether additive in which the polymerization is stopped at a 65% conversion.

We claim:

1. In the process of polymerizing to a high monomer conversion in the presence of a $C_8$-$C_{20}$ alkyl mercaptan in aqueous emulsion at a pH of about 10–13, chloroprene in admixture with from 0 to about equal weight of a copolymerizable monomer at a temperature from the freezing point of the emulsion to about 52°C., the improvement of having present in the emulsion about 0.05–1 part by weight per 100 parts of the starting monomer, of a polyether having the following formula:

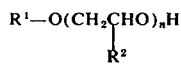

wherein $R^1$ is:
a. a $C_{10}$-$C_{30}$ alkyl, aralkyl, or alkenyl in which the double bond is separated from the oxygen atom by at least one saturated carbon atom; a $C_6$-$C_{30}$ aryl or alkaryl; dihydroabietyl or tetrahydroabietyl; or
b. 2-hydroxyethyl; and $R^2$ in each parenthetical unit is independently of any other such unit, either hydrogen or methyl; with the proviso that when $R^1$ is (a), $n$ is a number having an average value of from 2 to about 50; and when $R^1$ is (b), $n$ is a number such that the molecular weight of the compound is from about 1000 to about 6000, the units in which $R^2$ is hydrogen constituting 10 to 80 weight percent of the polyether and being present as the two terminal blocks, the central block of the polyether being constituted of units in which $R^2$ is methyl, this central block having a molecular weight from about 900 to about 4000;

the resulting polymer being substantially gel free.

2. The improvement of claim 1 wherein $R^1$ is a hydrocarbon radical, and $n$ has an average value of 3–20.

3. The improvement of claim 2 wherein $R^1$ is tridecyl.

4. The improvement of claim 2 wherein $R^1$ is 2-naphthyl.

5. The improvement of claim 2 wherein $R^1$ is nonylphenyl.

6. The improvement of claim 1 wherein $R^1$ is hydroxyethyl.

7. The improvement of claim 1 wherein the alkyl mercaptan is dodecyl mercaptan.

8. The improvement of claim 1 wherein the polymerization temperature is about 10°–48°C.

9. The improvement of claim 8 wherein the emulsifying agent is a sodium, potassium, or ammonium salt of wood rosin or of disproportionated rosin acid; the concentration of the emulsifying agent being about 1–4 parts per 100 parts by weight of monomer.

10. The improvement of claim 9 wherein there is also present in the emulsion up to one part by weight of a sulfate or sulfonate surfactant.

* * * * *